US012456792B1

(12) United States Patent
Ehresmann et al.

(10) Patent No.: US 12,456,792 B1
(45) **Date of Patent: *Oct. 28, 2025**

(54) VENTILATION APPARATUS FOR A CONTAINMENT OF ANTENNA ELEMENTS

(71) Applicants: Gregg Ehresmann, Yankton, SD (US); James Rhoads, Mesa, AZ (US)

(72) Inventors: Gregg Ehresmann, Yankton, SD (US); James Rhoads, Mesa, AZ (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/219,365

(22) Filed: Jul. 7, 2023

Related U.S. Application Data

(63) Continuation of application No. 17/957,005, filed on Sep. 30, 2022, now Pat. No. 11,817,624.

(60) Provisional application No. 63/251,379, filed on Oct. 1, 2021.

(51) Int. Cl.
*H01Q 1/02* (2006.01)
*H01Q 1/12* (2006.01)
*H01Q 1/44* (2006.01)

(52) U.S. Cl.
CPC ............. *H01Q 1/02* (2013.01); *H01Q 1/1242* (2013.01); *H01Q 1/44* (2013.01)

(58) Field of Classification Search
CPC .......... H01Q 1/02; H01Q 1/12; H01Q 1/1228; H01Q 1/1242; H01Q 1/246; H01Q 1/44; H05K 7/20; H05K 7/20009-20181; H05K 7/2019; H05K 7/20209; H05K 7/20536-20581
See application file for complete search history.

(56) References Cited

U.S. PATENT DOCUMENTS

| | | | |
|---|---|---|---|
| 5,349,362 A | 9/1994 | Forbes | |
| 6,658,797 B2 | 12/2003 | Jones | |
| 9,698,477 B1 | 7/2017 | Jabara | |
| 9,711,846 B2 | 7/2017 | Dundorf | |
| 9,742,886 B2 | 8/2017 | Hansen, Sr. | |
| 10,321,591 B2 | 6/2019 | Lapham | |
| 10,448,538 B1 | 10/2019 | Gaul | |
| 10,581,492 B1 * | 3/2020 | Corum | H04B 3/52 |
| 10,749,240 B1 | 8/2020 | Ochoa | |
| 11,355,837 B1 | 6/2022 | Mncenzi | |
| 11,817,624 B1 * | 11/2023 | Ehresmann | H01Q 1/1242 |
| 2005/0007295 A1 | 1/2005 | Janoschka | |

(Continued)

*Primary Examiner* — Robert Karacsony

(74) *Attorney, Agent, or Firm* — Jeffrey A. Proehl; Woods Fuller Shultz & Smith P.C.

(57) ABSTRACT

A system with a containment assembly formed by containment panels in an array about an interior of the assembly, and a ventilation apparatus for permitting passive air movement and producing active air movement through the interior. The ventilation apparatus may include an active air movement structure to produce active air movement into the interior. The active air movement structure may include at least one air entry opening located on the containment assembly toward the first end, at least one air exit opening located on the containment assembly toward the second end, and an air movement assembly positioned with respect to the containment assembly to create air movement in the interior of the containment assembly. Embodiments of the ventilation apparatus may include a passive air movement structure with at least one ventilation slot in the containment assembly and situated to permit a cross flow of air through the interior.

18 Claims, 6 Drawing Sheets

(56) References Cited

U.S. PATENT DOCUMENTS

| | | | | |
|---|---|---|---|---|
| 2005/0030250 | A1 | 2/2005 | Gottl | |
| 2008/0012784 | A1 | 1/2008 | Renfro | |
| 2016/0037539 | A1 | 2/2016 | Knapton | |
| 2017/0214115 | A1 | 7/2017 | Norrell | |
| 2017/0237146 | A1 | 8/2017 | Dureja | |
| 2018/0062247 | A1 | 3/2018 | Umbert | |
| 2018/0254545 | A1 | 9/2018 | Hendrix | |
| 2018/0277921 | A1 | 9/2018 | Ming | |
| 2018/0323503 | A1 | 11/2018 | Bouchard | |
| 2019/0261456 | A1 | 8/2019 | Lee | |
| 2019/0312339 | A1 | 10/2019 | Fritze | |
| 2020/0136236 | A1 | 4/2020 | Colapietro | |
| 2020/0182451 | A1 | 6/2020 | Girouard | |
| 2021/0175596 | A1 | 6/2021 | Migliorino | |
| 2021/0313665 | A1 | 10/2021 | Hoganson | |
| 2021/0313666 | A1 | 10/2021 | Castronova | |
| 2021/0321486 | A1 | 10/2021 | Mirza | |
| 2021/0336331 | A1* | 10/2021 | Rai | H01Q 1/42 |
| 2022/0069434 | A1* | 3/2022 | Chase | H01Q 1/125 |
| 2022/0278447 | A1 | 9/2022 | Radey | |
| 2023/0050147 | A1 | 2/2023 | Hoganson | |

* cited by examiner

VENTILATION APPARATUS FOR A CONTAINMENT OF ANTENNA ELEMENTS

REFERENCE TO RELATED APPLICATIONS

This application is a continuation of U.S. Non-provisional patent application Ser. No. 17/957,005, filed Sep. 30, 2022, and which claims the priority benefit of U.S. Provisional Patent Application No. 63/251,379, filed Oct. 1, 2021, the disclosures of each of which are hereby incorporated by reference in their entireties.

BACKGROUND

Field

The present disclosure relates to wireless transmission equipment facilities and more particularly pertains to a new ventilation apparatus for a containment of antenna elements, such as may be found on a communications tower as an example, for providing passive and/or active ventilation for the interior of the containment.

Description of the Prior Art

Wireless communications, such as cellular telephone communications, typically depend upon antennas (and the equipment utilized to operate the antennas) to enable the wireless transmissions over wide areas in a substantially seamless manner. Elevation of these antennas high above the ground surface provides the greatest potential coverage for the transmission and reception of wireless signals.

However, the antennas and the associated equipment are more effective at elevated locations, they are also more visible to the eye, and in populated areas the appearance of the antennas and equipment can be unappealing. Canisters have been developed for concealing the antennas and associated equipment from view, and are generally positioned on the top of an elevating pole, to provide an appearance resembling a thick flagpole or even the trunk of a tree.

While highly suitable for blocking the antennas and equipment from view, the canisters tend to interfere with the dissipation of heat from operation of the equipment that is usually not a problem for installations not employing canisters. Approaches to enhancing the heat dissipation from the equipment in the canisters have been proposed and implemented by, for example, increasing airflow through the canisters to take advantage of normal environmental airflow, or wind, present at the elevations of the antennas and equipment, such as the approach disclosed in U.S. Pat. No. 10,749,240 to Ochoa.

SUMMARY

In one aspect, the disclosure relates to a system which may comprise a containment assembly configured to conceal from view at least one antenna and a transceiver element positioned in an interior of the containment assembly and a ventilation apparatus for providing air movement in the interior of the containment assembly. The ventilation apparatus may comprise an active air movement structure configured to produce active air movement through the interior of the containment assembly, and the active air movement structure may include at least one air entry opening located on the containment assembly, at least one air exit opening located on the containment assembly, and an air movement assembly positioned with respect to the containment assembly to create air movement in the interior of the containment assembly.

In another aspect, the disclosure relates to a system which may comprise a containment assembly configured to conceal from view at least one antenna and a transceiver element positioned in an interior of the containment assembly, with the containment assembly being elongated along a longitudinal axis and having a first end and a second end. The containment assembly may comprise a plurality of containment panels positioned in an array about the interior of the containment assembly. The system may further comprise a ventilation apparatus for providing air movement in the interior of the containment assembly, and the ventilation apparatus may permit passive air movement through the interior and produce active air movement through the interior. The ventilation apparatus may comprise a passive air movement structure configured to permit passive air movement through the interior of the containment assembly, and the passive air movement structure may include at least one ventilation slot formed in at least a pair of the containment panels to permit a cross flow of air through the interior of the containment assembly. The ventilation structure may also include an active air movement structure configured to produce active air movement through the interior of the containment assembly. The active air movement structure may include at least one air entry opening located on the containment assembly toward the first end, at least one air exit opening located on the containment assembly toward the second end, and an air movement assembly positioned with respect to the containment assembly to create air movement in the interior of the containment assembly.

In another aspect, the disclosure relates to a system which may comprise a containment assembly configured to conceal from view at least one antenna and a transceiver element positioned in an interior of the containment assembly. The containment assembly may be elongated along a longitudinal axis and have a first end and a second end. The containment assembly may comprise a plurality of containment panels positioned in an array about the interior of the containment assembly. The system may further comprise a ventilation apparatus for providing air movement in the interior of the containment assembly, and may permit passive air movement through the interior and produce active air movement through the interior. The ventilation apparatus may comprise a passive air movement structure configured to permit passive air movement through the interior of the containment assembly, and the passive air movement structure may include at least one ventilation slot formed in at least a pair of the containment panels to permit a cross flow of air through the interior of the containment assembly. The ventilation apparatus may also comprise an active air movement structure configured to produce active air movement through the interior of the containment assembly. The active air movement structure may include at least one air entry opening located on the containment assembly toward the first end, at least one air exit opening located on the containment assembly toward the second end, and an air movement assembly positioned with respect to the containment assembly to create air movement in the interior of the containment assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
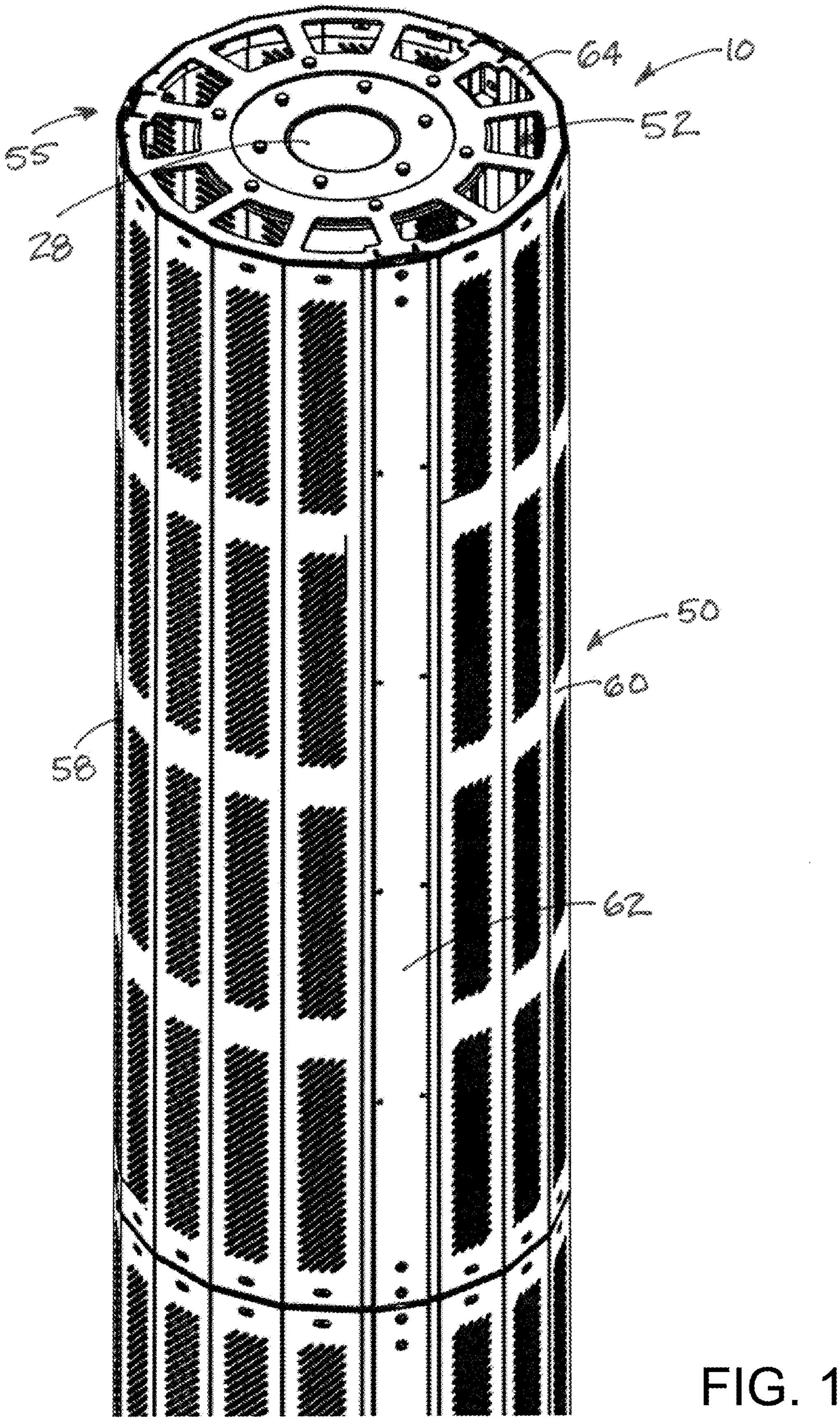
FIG. 1 is a schematic perspective view of an upper portion of a new system including a containment assembly and a ventilation apparatus for the containment assembly according to the present disclosure.
Figure 2:
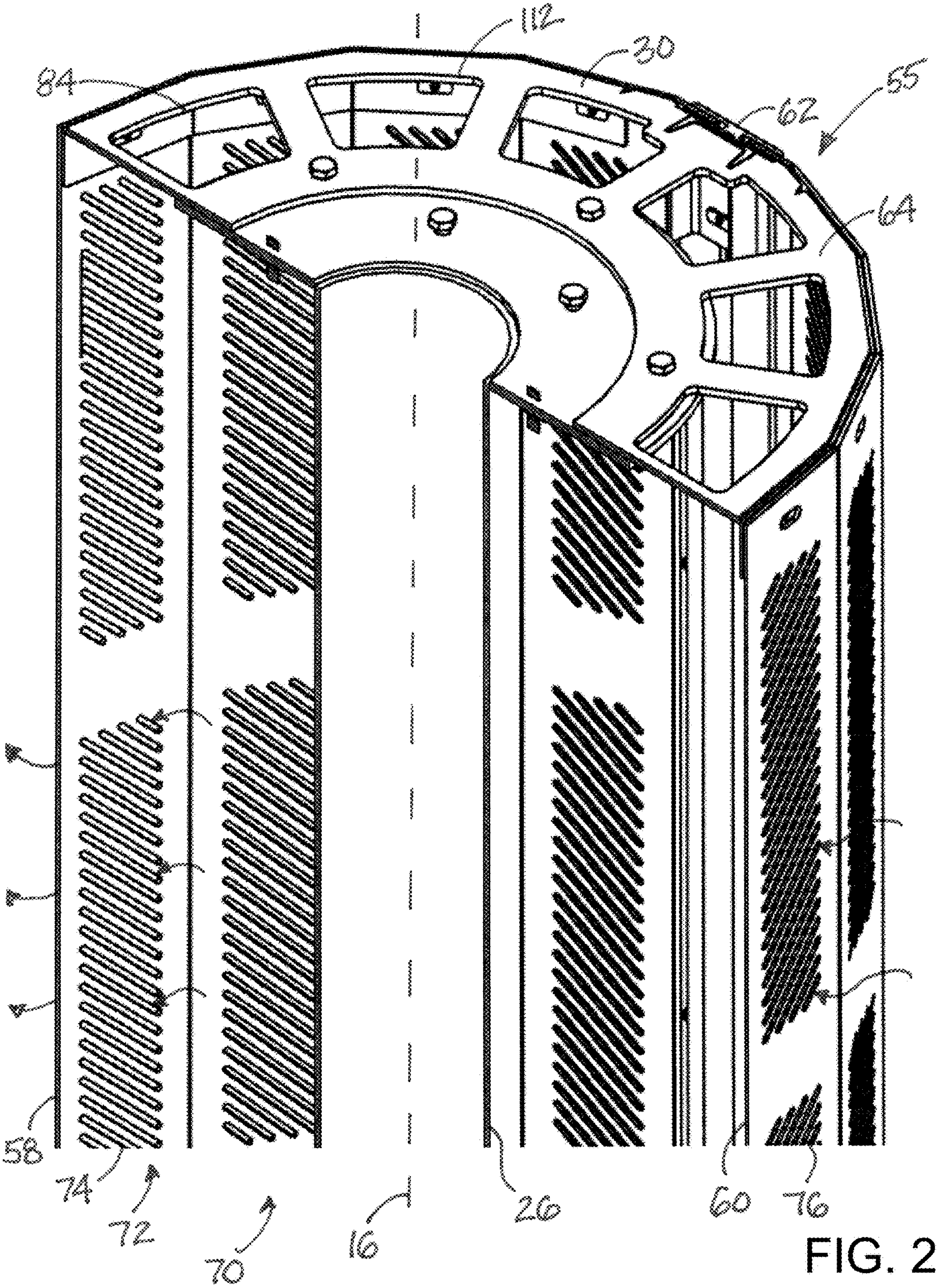
FIG. 2 is a schematic perspective view of an enlarged, sectional portion of elements of the passive air movement structure of the disclosure, according to an illustrative embodiment.
Figure 3:
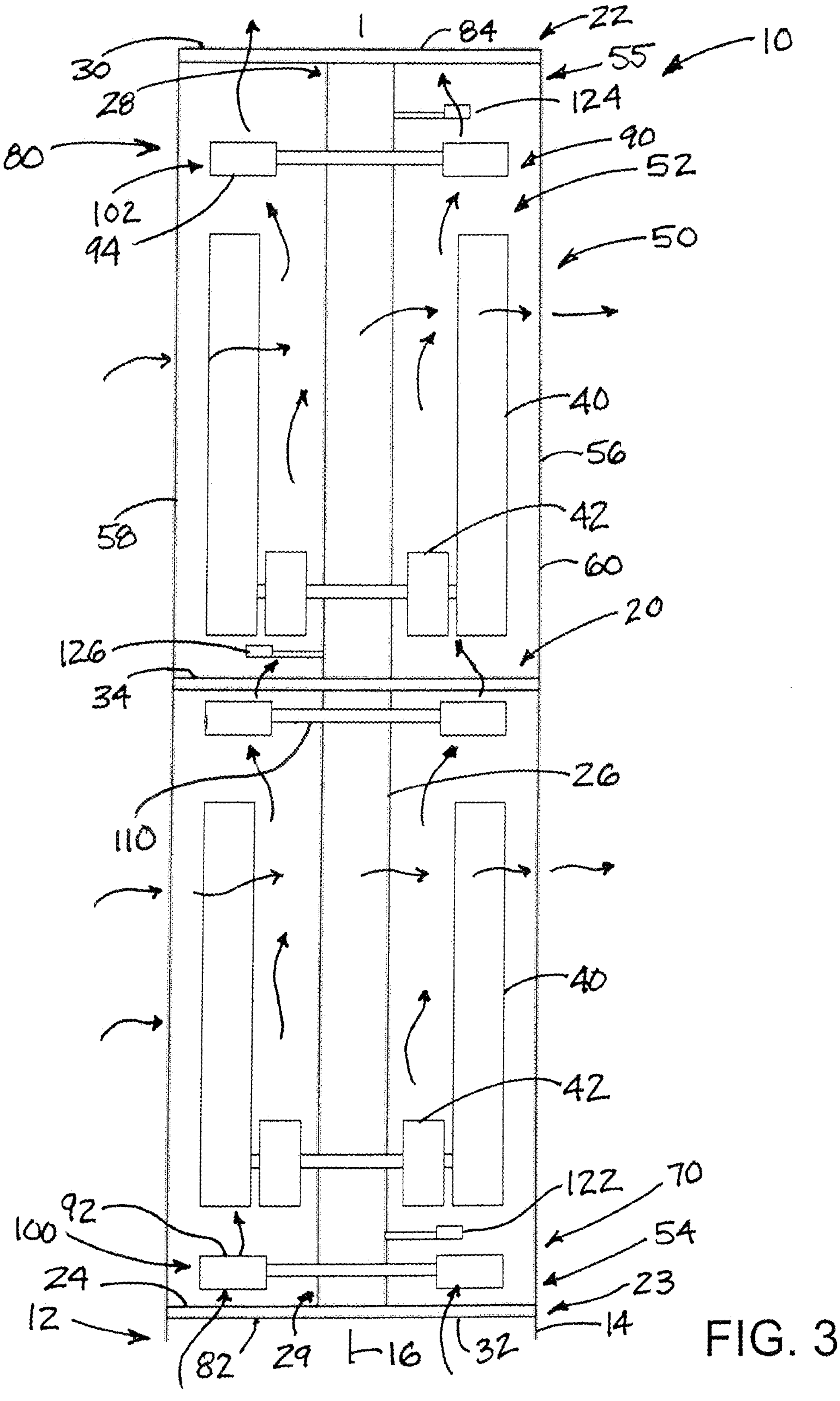
FIG. 3 is a schematic side sectional view of the ventilation apparatus, showing elements of the passive and active air movement structures, according to an illustrative embodiment.

With reference now to the drawings, and in particular to FIGS. 1 through 6 thereof, a new ventilation apparatus for a containment of antenna elements embodying the principles and concepts of the disclosed subject matter will be described.

The applicants have recognized that the existing approaches utilized for ventilating canisters employed to conceal elevated communications antennas tend to work well in some conditions and in some geographical areas, but the variability in the conditions can make it difficult the task of adequately ventilating the canister under all conditions that might be experienced by an installation. Transitions from daytime to nighttime, season to season, as well as other factors can further increase the variability in the ventilation requirements of the antennas and the associated equipment.

The applicants have thus developed a ventilation apparatus which utilizes a hybrid of passive ventilation and active ventilation to enhance the heat dissipation and/or cooling of the antenna and antenna-related components positioned within the canister. In at least some implementations, the passive ventilation for the canister interior may be permitted on a regular and continuous basis, while the active ventilation may be provided on an intermittent basis and may be provided on an as-needed basis based upon current or real-time conditions sensed in the canister interior, as well as, in some applications, conditions sensed exterior of the canister.

Accordingly, in some aspects, the disclosure relates broadly to a transmission antenna system 10 employed in the transmission of wireless signals over an area, and often utilizes an elevated position above the ground surface to extend and expand the range of the transmitted wireless signals.

In some installations, the system 10 may comprise a structure providing an elevated environment, such as, for example, a monopole extending upwardly from the ground surface to a position elevated above the ground surface. In other installations, the system may take advantage of the elevation of all or a portion of an existing structure, such as an inhabited building, to provide a position elevated above the ground surface, such as in the “penthouse” at the uppermost portion of the building structure. In the illustrative embodiments, the system 10 may include an elongate upstanding main pole 12 which has an apex 14 at the point of the uppermost extent of the pole 12. The main pole 12 may extend upwardly from a surface, such as the ground surface, and may be elongated along a longitudinal axis 16.

The system 10 may also include an antenna support assembly 20 extending upwardly from the main pole 12, such as from the apex of the pole 12. The antenna support assembly 20 has a top 22 and a bottom 23 which may be mounted on the apex of the main pole such that the assembly 20 generally extends along the longitudinal axis 16. The antenna support assembly 20 may comprise a base 24 mounted on the apex 14 of the main pole, and the base may extend laterally outwardly with respect to the longitudinal axis 16 of the pole 12. The support assembly 20 may further comprise a mast 26 which is mounted on and extends upwardly from the base 24, and the mast typically has an upper end 28 toward the top 22 of the assembly 20 and a lower end 29 toward the bottom 23 of the assembly 20, and the lower end may be suitably united to the base 24.

The antenna support assembly 20 may also comprise a plurality of supports 30, 32, 34 which are mounted on the mast 26 at spaced locations along the length of the mast between the upper 28 and lower 29 ends. Illustratively, each of the supports 30, 32, 34 may have a support plate that extends outwardly from the mast 26 and a perimeter wall that extends along an outer peripheral portion of the support plate, although suitable supports may have other configurations. The support plate of one or more of the supports 30, 32, 34 may have at least one antenna aperture 36, and typically each support plate has a plurality of antenna apertures. The plurality of supports may include an uppermost support 30 positioned toward the upper end 28 of the mast, and a lowermost support 32 positioned toward the lower end 29 of the mast. In some embodiments, the lowermost support 32 may be spaced from the base 24 of the support assembly, although in some installations the lowermost support and the base 24 may be integrated with each other. The plurality of supports may also include one or more intermediate supports 34 which are positioned between the uppermost 30 and lowermost 32 supports, and the intermediate supports may typically be spaced from the uppermost and lowermost supports, as well as being spaced from each other.

The system 10 also may have at least one antenna 40, and typically has a plurality of antennas, for emanating wireless signals via radio waves into the air. The antenna or antennas 40 are mounted on the antenna support assembly 20, and may be mounted on at least one of the supports 30, 32, 34 of the support assembly. The antenna or antennas may extend in an orientation that is generally parallel to the mast 26 and the longitudinal axis 16 of the pole 12. A portion of the antenna or antennas may extend through one or more of the antenna apertures of the supports 30, 32, 34.

The system 10 may have also include elements associated with the antenna 40 to facilitate transmission and reception by the antenna. For example, at least one transceiver 42 that is configured to transmit a wireless signal via the antenna or antennas 40, typically based upon amplification of a signal received by the transmitter radio via a wired connection, as well as being configured to receive a wireless signal via the antenna or antennas. The transceiver 42 may be mounted on the antenna support assembly 20, such as on one of the supports 30, 32, 34, and often is located below one or more antennas 40 of the system 10. Other elements associated with the antenna 40 may include, for example, digital signal processors, circuitry for controlling communication operation, a global positioning system (GPS) receiver, and power supply components.

A containment assembly 50 of the system 10 may be provided to at least partially enclose and at least partially conceal elements of the system such as the antenna support assembly 20, the antenna 40, and the transceiver 42. The containment assembly 50 may define an interior 52 having therein the contained elements, and the assembly 50 may block the elements from being viewable by sight from a point of view outside of the interior, although the assembly 50 may not provide complete concealment of the elements. The containment assembly 50 may be mounted or mountable on the antenna support assembly 20, which may provide support and mounting points for components of the assembly 50. In some embodiments, the containment assembly 50 may have a central axis and may be elongated in shape along the central axis with a first end 54 and a second end 55. The first end 54 may be located at a relatively lower vertical level when the containment assembly is mounted on the antenna support assembly 20, and may be positioned adjacent to the lower end 29 of the mast. The second end 55 may be located at a relatively higher vertical level when the containment assembly is mounted on the support assembly 20, and may be positioned adjacent to the upper end 28 of the mast. The containment assembly 50 may have an outer surface 56 which is exposed to view by an observer located, for example, on the ground surface. Illustratively, the outer surface 56 may have a substantially cylindrical, or multi-faceted cylindrical, configuration. In some installations, a plurality of containment assemblies 50 may be utilized.

In embodiments, the containment assembly 50 may comprise a plurality of containment panels 58, 60 which are supported by the plurality of supports 30, 32, 34, and may be positioned in an array about the antenna support assembly and the interior of the assembly 50. Illustratively, the containment panels 58, 60 may be elongated in a direction substantially parallel to the longitudinal axis 16 of the pole 12. The containment assembly 50 may also comprise a plurality of joiner panels 62 which are configured to join adjacent containment panels, and each joiner panel may be mounted or mountable on adjacent side edges of adjacent containment panels 58, 60. Illustratively, each joiner panel 62 may receive the adjacent side edges of the adjacent containment panels. The containment assembly 50 may further comprise an adapting frame structure 64 configured to mount the containment panels and the joiner panels of the assembly 50 on the antenna support assembly 20. One illustrative example of the adapting frame structure 64, as well as other elements of the containment assembly 50, is disclosed in U.S. Pat. No. 10,749,240, which is hereby incorporated by reference in its entirety.

One highly advantageous aspect of the system 10 is a ventilation apparatus 70 for permitting and/or providing air movement in the interior 52 of the containment assembly. In some embodiments, the ventilation apparatus 70 may permit passive air movement in the interior 52 and may produce active air movement in the interior 52, and may permit passive air movement through the interior and may produce active air movement through the interior.

The ventilation apparatus 70 may comprise a passive air movement structure 72 which is configured to permit passive air movement into the interior of the containment assembly, and may also permit passive air movement out of the interior of the containment assembly to provide passive air movement through the interior. The passive air movement structure 72 may be formed on at least one of the containment panels 58 of the containment assembly 50. The passive air movement structure 72 may include at least one ventilation slot 74 in at least one of the containment panels, and may include a plurality of ventilation slots 74, 76 in one or more of the containment panels. In some embodiments, the plurality of ventilation slots 74, 76 may be located in a pair of the containment panels 58, 60 with each of the panels having portions of the plurality of ventilation slots being located at substantially opposite horizontal locations on the containment assembly 50 to permit and facilitate a cross flow of air through the interior 52 of the containment assembly. While ventilation slots having an elongated length and narrow width relative to the length may provide the most effective concealment from view, it will be recognized that the shape of the openings forming the slots may vary from the elongated shape.

The ventilation apparatus 70 may also comprise an active air movement structure 80 which is configured to produce active air movement in the interior 52 of the containment assembly. The active air movement structure 80 may be configured to produce or actively cause air movement into the interior of the containment assembly, and may actively cause air movement out of the interior of the containment assembly to produce active air movement through the interior 52. Illustratively, the active air movement structure 80 may be configured to produce or encourage a substantially vertical upward airflow, such as from the first end 54 to the second end 55 of the containment assembly 50.

The active air movement structure 80 may include at least one air entry opening 82, and optionally in some embodiments may comprise two or more air entry openings, which may be located on the containment assembly 50 toward the first end 54. In some embodiments, the air entry opening or openings may be located in the lowermost support 32, or the base 24, of the antenna support assembly. In some embodiments, the air entry opening or openings may be located adjacent to one of the containment panels of the containment assembly, and may be formed, for example, by a gap between the containment panel and other elements, such as the lowermost support or the base of the support assembly. In embodiments in which the containment panels include slots 74, 76, one or more of the slots may function as air entry openings, such as slots that are located toward the first end of the containment assembly.

The active air movement structure 80 may also include at least one air exit opening 84, and optionally in some embodiments may comprise two or more air exit openings, which may be located on the containment assembly toward the second end 55. In some embodiments, the air exit opening or openings may be located in the uppermost support 30 of the antenna support assembly. In some embodiments, the air exit opening may be located adjacent to one of the containment panels of the containment assembly, and may be formed, for example, by a gap between the containment panel and other elements, such as the uppermost support of the support assembly. In embodiments in which the containment panels include slots 74, 76, one or more of the slots may function as air exit openings, such as slots located toward the second end of the containment assembly.

The active air movement structure 80 may further include an air movement assembly 90 positioned with respect to the containment assembly to create air movement in the interior 52 of the containment assembly. In some embodiments, the air movement assembly 90 may be positioned in the interior 52 of the containment assembly, and elements of the assembly 90 may be mounted on the mast 26 of the antenna support assembly. In embodiments, the air movement assembly 90 may be mounted on the containment assembly 50, and elements of the assembly 90 may be located on the periphery of the containment assembly 50.

The air movement assembly 90 may comprise an air movement device 92 configured to cause air movement in the interior of the containment assembly in a direction moving toward the air exit opening 84, and may cause air movement in the interior 52 of the containment assembly 50 through the air entry opening 82. In the illustrative embodiments, the air movement device 92 is positioned toward the first end 54 of the containment assembly 50 in proximity to the air entry opening 82 to produce air movement through the opening 82 and in a generally upward direction. The air movement device 92 may have an operational speed which may range from zero to a maximum operational speed. The air movement device 92 may have a deactivated condition in which the operational speed is zero, and an activated condition in which the operational speed is greater than zero up to the maximum operational speed.

In some embodiments, the air movement assembly 50 may include a plurality of the air movement devices including, for example, a pair of the air movement devices 92, 94. Optionally, the air movement assembly 50 may have the plurality of air movement devices positioned at various levels in the interior 52 of the containment assembly (see, e.g., FIG. 3). Further, the air movement devices 92, 94 may be positioned at different distances from the first end 54 of the containment assembly, which may effectively position the devices 92, 94 at different vertical elevations in the interior 52 of the containment assembly with reference to the mast or the ground surface. Illustratively, while a first one 92 of the air movement devices may be positioned relatively closer to the air entry opening 82, and correspondingly relatively closer to the first end 54 of the containment assembly 50, a second one 94 of the air movement devices may be positioned relatively closer to the air exit opening 84, and correspondingly relatively closer to the second end 55 of the containment assembly. Thus, the first air movement device 92 may be more influential in moving air into the interior 52 and the second air movement device 94 may be more influential in moving air out of the interior 52.

In some configurations of the air movement assembly 50, one or more of the air movement devices 92, 94 may be positioned adjacent to an element in the interior 52 of the containment assembly 50, such as the transceiver 42 or the antenna 40. For example, the air movement device 92 may be positioned between the transceiver and the first end 54 of the containment assembly such that the air movement device is located below the transceiver and is oriented to blow air toward the transceiver.

In some embodiments, one or more of the air movement devices 92, 94 may comprise a fan 96, which illustratively may be an axial flow fan with a rotational speed. The air movement device 92 may also comprise a fan speed sensor 98 which is configured to sense a rotational speed of the fan when the air movement device is in the activated condition, and the fan speed sensor may generate a speed signal corresponding to a current operational speed of the fan speed sensor.

Figure 4:
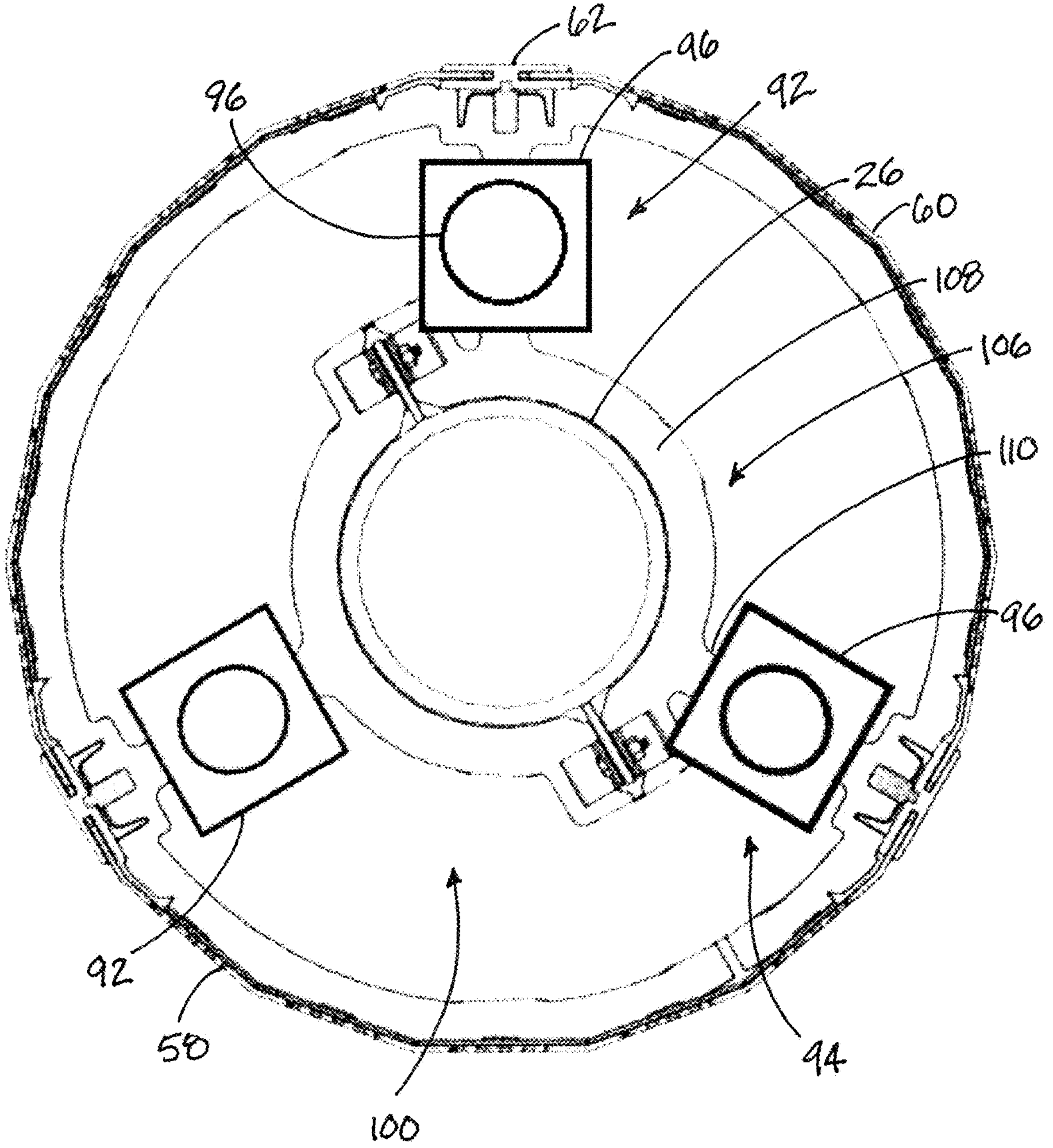
FIG. 4 is a schematic sectional view of the containment assembly with elements of the active air movement structure, according to an illustrative embodiment.
Figure 5:
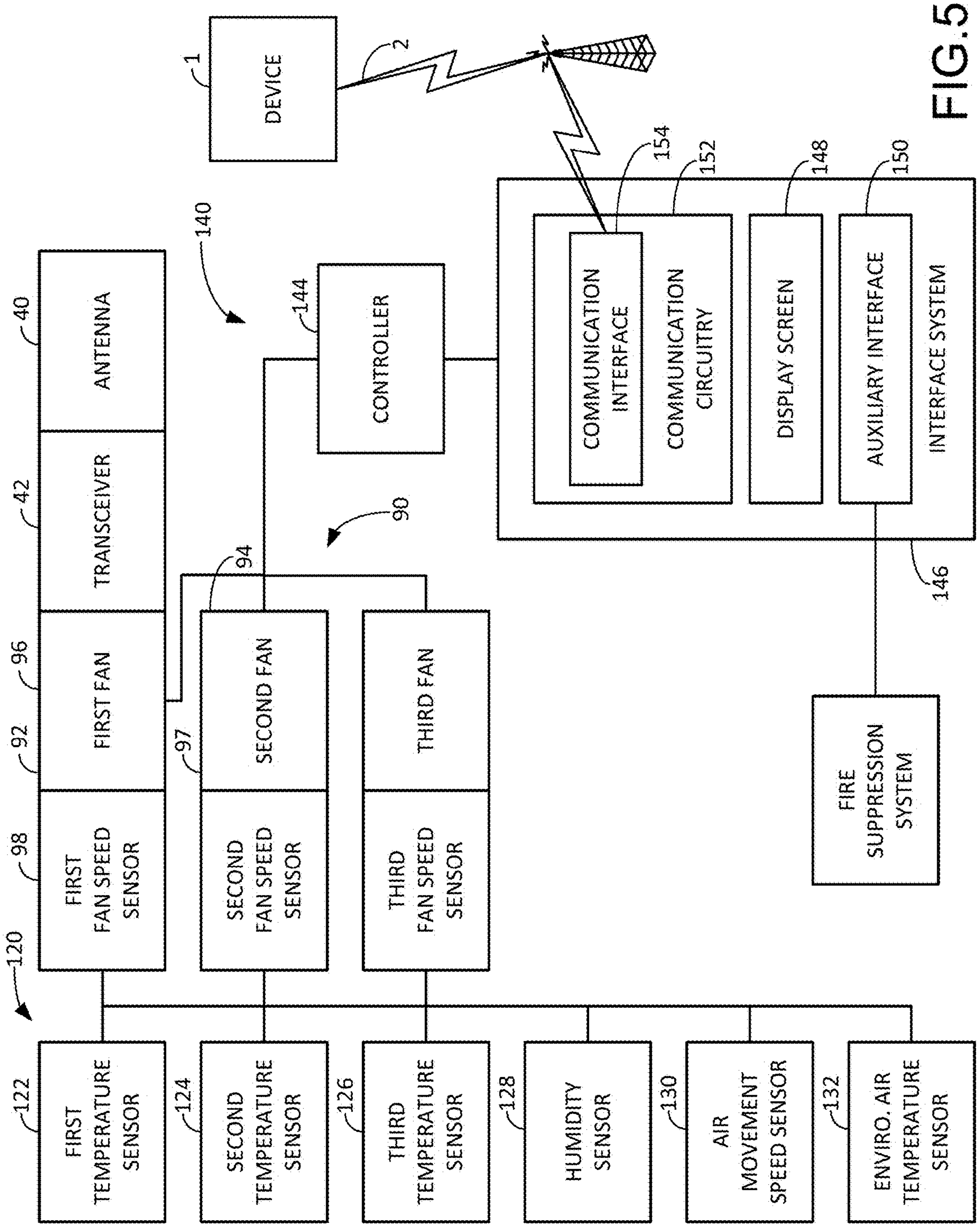
FIG. 5 is a schematic diagram of elements of the ventilation apparatus, according to an illustrative embodiment.
Figure 6:
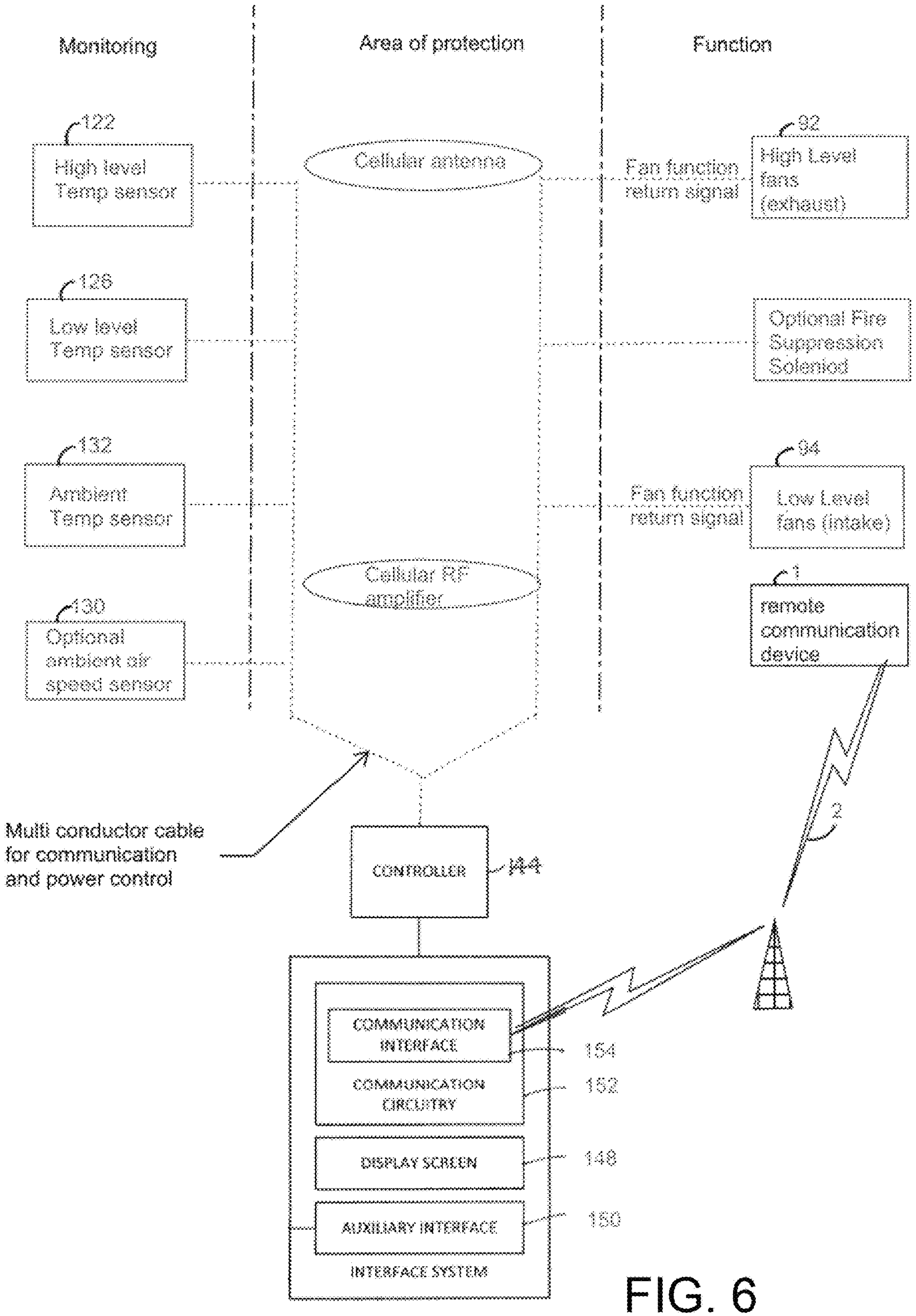
FIG. 6 is a schematic one line diagram of the system, according to an illustrative implementation.

In some preferred embodiments, one or more of the air movement devices 92 of the air movement assembly 90 may comprise a plurality of fans 96, with the individual fans of the air movement device having different positions in the interior 52 of the containment assembly. In some embodiments, the fans 96 of at least one (or more) of the air movement devices 92, 94 may be positioned at different angular positions about the mast of the antenna support assembly, and the devices may be substantially equally angularly circumferential spacings from each other. In the illustrative embodiments, such as shown in FIG. 4 of the drawings, the air movement device includes three fans arranged with substantially equally angularly spacing, such that the three fans may be positioned with respect to the mast 26 with approximately 120 degrees between the fans. Optionally, an air movement device having four fans may be positioned with approximately 90 degrees between devices, and so on. The plurality of fans of a particular air movement device may be arrayed in a tier 100 of the fans, and a plurality of movement devices may be arrayed in a plurality of tiers 100, 102 located at different distances from the first end 54 of the containment assembly. Each tier 100, 102 may thus have multiple fans.

The air movement assembly 90 may further include an air movement device support 106 configured to support the air movement device or devices in the interior 52 of the containment assembly. Each device support 106 may be employed to support the fan or fans of the air movement device of a tier. In some embodiments, the air movement device support 106 may be mounted on the mast 26 of the antenna support assembly 10, and the device support 106 may extend radially outward from the mast to support the fan or fans of the air movement device in a location or locations spaced radially outward from the mast. Illustratively, the air movement device support 106 may be configured to support a plurality of the fans of the air movement device at substantially equal circumferentially spaced locations about the mast.

In greater detail, an illustrative air movement device support 106 may include a central collar 108 for circumscribing the mast 26, and the collar 108 may be mounted on the mast in a manner that resists movement of the collar along the mast in the longitudinal direction. The air movement device support 106 may also include at least one radial support arm 110 extending from the central collar 108, and the number of radial support arms may correspond to the number of air movement devices in a tier. The radial support arm 110 may have an inner end that is mounted on, and may be united to, the collar 108, and the arm 110 may terminate at an outer end. The outer end may define a mount for the air movement device, such as the fan 96.

In some embodiments of the system 10, one or more air movement devices 92 may be supported on one or more of the supports of the antenna support assembly, such as the lowermost support 32 and/or the uppermost support 30. The respective support of the support assembly 20 may have an aperture 112, and an air movement device may be mounted on the support adjacent to the aperture 112 to produce air flow through the aperture when the air movement device is activated. For example, an air movement device may be mounted on the lowermost support of the antenna support assembly and be configured to produce air movement into the interior 52 of the containment assembly, and may produce air movement in an upward direction into the interior. An air movement device may be mounted on the uppermost support of the antenna support assembly and be configured to produce air movement out of the interior of the containment assembly.

The active air movement structure 80 may also comprise a sensor assembly 120 which is configured to sense characteristics that are associated with the containment assembly 50, such as, for example, characteristics of or conditions in the interior 52 of the assembly 50. In some embodiments, the sensor assembly may include at least one temperature sensor 122 configured to sense the temperature of the air in the interior 52 of the containment assembly. In some embodiments, the temperature sensor 122 may be configured to sense a temperature of an element in the interior of the containment assembly, such as the temperature on the surface of the element or even an internal temperature of the element. Illustratively the element in the interior 52 may comprise the transceiver, or a component of the transceiver, particularly a component that generates heat that needs to be dissipated. The temperature sensor 122 may generate a temperature signal corresponding to the temperature currently being sensed by the temperature sensor.

In some embodiments, a plurality of temperature sensors may be provided for location at different points in the interior 52 of the containment assembly and optionally for utilization for sensing different temperatures, such as air temperatures and temperatures associated with elements or components of the elements. Illustratively, the plurality of temperature sensors may be located at different distances from the first end 54 of the containment assembly, thus positioning the sensors at different vertical heights above the first end 54 and relative to the ground surface. In an illustrative embodiment, the plurality of temperature sensors may include a first temperature sensor 122 for positioning relatively closer to the first end 54 of the containment assembly and a second temperature sensor 124 positioned relatively closer to the second end 55 of the containment assembly. Optionally, one or more of the temperature sensors may be associated with one or more of the tiers 100, 102 of the air movement devices. As a further option, additional temperature sensors may be located at various locations in the interior 52 of the containment assembly, such as, for example, a third temperature sensor 126 positioned between the first 122 and second 124 temperature sensors.

The sensor assembly 120 may include additional sensors configured to sense characteristics other than temperature that are associated with the containment assembly. In some embodiments, the sensor assembly 120 may optionally include a humidity sensor 128 configured to sense a humidity level in the environment of the containment assembly, and the humidity sensor may be positioned in the interior 52 of the containment assembly although positioning exterior of the assembly 50 may be utilized. The sensor assembly 120 may include an air movement speed sensor 130 configured to sense a speed of air movement. The air movement speed sensor 130 may be positioned with respect to the containment assembly in a location suitable to sense the speed of air movement exterior of the containment assembly, such as the speed of the wind in the environment exterior to the containment assembly. Optionally, the air movement speed sensor 130 may be positioned in the interior 52 of the containment assembly to sense the speed of air movement in the interior.

Further, the sensor assembly 120 may include an environmental air temperature sensor 132 which is configured to sense a temperature of air exterior to the containment assembly for determining the environmental temperature experienced by the assembly 50. Sensors for other external conditions may also be utilized, such as, for example, a solar light intensity sensor configured to sense an intensity of light striking the outer surface of the containment assembly.

The active air movement structure 80 may further include a control assembly 140 configured to control various aspects of the system 10 as well as receive inputs for control the system. The control assembly 140 may include a housing 142 located proximate to the ventilation apparatus 70, and may be mounted on or integrated into the main pole 12 of the system or the position relatively closely adjacent to the pole. The control assembly 140 may also comprise a controller 144 which is configured to activate and deactivate operation of the air movement device 92 or devices 92, 94. The controller 144 may thus be configured to control the supply of power to the air movement devices to change the air movement devices between the activated and deactivated conditions based upon, for example, input from the sensor assembly 120 regarding characteristics associated with the containment assembly. Illustratively, the controller 144 may comprise a programmable logic controller located in the interior of the housing 142, although any suitable mechanism for receiving inputs, executing a program, and issuing commands may be utilized.

The controller 144 may be in communication with the sensor assembly 120 to receive information regarding conditions interior and exterior to the containment assembly. The controller 144 may have associated storage for storing an operational program of instructions. The controller 144 may be configured to execute instructions. In some implementations, the operational program may include instructions to detect the operational status of elements of the active air movement structure, receive the temperature signal from one or more temperature sensors, and compare the current temperature(s) represented by the temperature signal(s) to a predetermined range of operational temperatures. The operational program may further include instructions to, if the current temperature is in the predetermined range of operational temperatures, maintain the operational status of the active air movement structure. If the current temperature is greater than the predetermined range of operational temperatures, the operational program may include instructions to initiate a cooling protocol of operation for the active air movement structure, which may include, for example, commencing operation, or enhancing the current operation, of the active air movement structure. Enhancing operation of the active air movement structure may include increasing a rotational speed of the fan 96 of the air movement device 92.

Enhancing operation of the active air movement structure may also include starting operation of additional air movement device or devices. Alternatively, if the current temperature is less than the predetermined range of operational temperatures, the operational program may include instructions to terminate or degrade operation of the active air movement structure, such as, for example, turn off one or more of the fans of the air movement devices or decreasing the rotational speed of one or more of the fans.

The control assembly 140 may further include an interface system 146 which is configured to communicate operational information and receive operational commands. The interface system 140 is in communication with the controller 144 to permit the exchange of signals therebetween. In some embodiments, the interface system 146 may provide a local interface component and a remote interface component. The local interface component may comprise a human interface, or interface for conveying information to a human as well as receiving information or commands from a human. The human interface may include a display screen 148 configured to interact with a human, and the screen 148 may be configured to display images to a user and may be configured to receive input from a user. The display screen 148 may be configured to be actuated by a user, such as by responding to touch actuation by the user. The display screen 148 may be in communication with the controller 144, and may be mounted on the housing of the control assembly. The local interface component may further comprise an auxiliary interface 150 configured to communicate with other systems local to the antenna tower such as, for example, a fire suppression system configured to suppress a fire in the interior of the containment assembly when extreme heat or fire is detected by sensors of the sensor assembly 120.

The remote interface component of the interface system 146 may comprise communication circuitry 152 configured to communicate operational information from the controller 144 to a communication device 1 that is located remote to the location of the controller 144, and typically remote to the location of the antenna tower. Communication device 1 may comprise, for example, an information handling device such as a cellular telephone with processing capabilities (often referred to as a "smart phone"), a tablet computer, a laptop computer, a desktop computer, as well as other devices having similar capabilities. The communication circuitry 152 may include a communication interface 154 configured to communicate with a data communication network 2 to thereby communicate with one or more communication devices 1. In some embodiments, the communication interface 154 may comprise a wireless modem configured to communicate with a cellular telephone communication network, and in some embodiments the communication interface 154 may comprise a hardwired modem configured to communicate with a communication network. The communication circuitry 152 may be configured to send signals over the communication network 2 to the communication device 1 to permit transfer of information commands therebetween.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:

a containment assembly configured to conceal from view at least one antenna and a transceiver element positioned in an interior of the containment assembly; and a ventilation apparatus for providing air movement in the interior of the containment assembly, the ventilation apparatus comprising:

an active air movement structure configured to produce active air movement through the interior of the containment assembly, the active air movement structure including:

at least one air entry opening located on the containment assembly;

at least one air exit opening located on the containment assembly; and an air movement assembly positioned with respect to the containment assembly to create air movement in the interior of the containment assembly;

wherein the ventilation apparatus is configured to permit passive air movement through the interior and produce active air movement through the interior;

wherein the ventilation apparatus further comprises a passive air movement structure configured to permit passive air movement through the interior of the containment assembly, the passive air movement structure including at least one ventilation slot formed in the containment assembly and situated to permit a cross flow of air through the interior of the containment assembly;

an antenna support assembly extending upwardly from a main pole, the antenna support assembly comprising:

a mast for extending upwardly from the main pole, the mast having an upper end and a lower end; and a plurality of supports mounted on the mast, the plurality of supports including:

an uppermost support positioned toward the upper end of the mast; and a lowermost support positioned toward the lower end of the mast, the at least one air entry opening being formed by an aperture in the lowermost support:

wherein the active air movement structure includes a plurality of air movement devices, at least one of the air movement devices being mounted on the lowermost support of the antenna support assembly adjacent to the aperture to produce air movement into the interior of the containment assembly through the at least one air entry opening;

wherein the at least one air exit opening is formed by an aperture in the uppermost support of the antenna support assembly; and wherein at least one of the air movement devices is mounted on the uppermost support of the antenna support assembly adjacent to the aperture to produce air movement out of the interior of the containment assembly through the at least one air exit opening.

2. The system of claim 1 wherein the containment assembly is elongated along a longitudinal axis and having a first end and a second end, the at least one air entry opening being located toward the first end of the containment assembly and the at least one air exit opening being located toward the second end of the containment assembly.

3. A system comprising:

a containment assembly configured to conceal from view at least one antenna and a transceiver element positioned in an interior of the containment assembly, the containment assembly being elongated along a longitudinal axis and having a first end and a second end, the containment assembly comprising a plurality of containment panels positioned in an array about the interior of the containment assembly, a ventilation apparatus for providing air movement in the interior of the containment assembly, the ventilation apparatus permitting passive air movement through the interior and producing active air movement through the interior, the ventilation apparatus comprising:

a passive air movement structure configured to permit passive air movement through the interior of the containment assembly, the passive air movement structure including at least one ventilation slot formed in at least a pair of the containment panels to permit a cross flow of air through the interior of the containment assembly; and an active air movement structure configured to produce active air movement through the interior of the containment assembly, the active air movement structure including:

at least one air entry opening located on the containment assembly at the first end;

at least one air exit opening located on the containment assembly at the second end; and an air movement assembly positioned with respect to the containment assembly to create air movement in the interior of the containment assembly.

4. The system of claim 3 wherein the air movement assembly is positioned in the interior of the containment assembly.

5. The system of claim 3 additionally comprising an antenna support assembly extending upwardly from a main pole, the containment assembly being mounted on the antenna support assembly, the air movement assembly being mounted on the antenna support assembly.

6. The system of claim 3 wherein the air movement assembly comprises an air movement device configured to cause air movement in the interior of the containment assembly in a direction moving from the at least one air entry opening toward the at least one air exit opening.

7. The system of claim 6 wherein the air movement device is positioned adjacent to one element selected from a group of elements consisting of at least one transceiver and at least one antenna.

8. The system of claim 3 wherein the air movement assembly comprises a plurality of air movement devices at different positions in the interior of the containment assembly.

9. The system of claim 8 wherein the air movement devices of the plurality of air movement devices are positioned at different angular positions about a central axis of the containment assembly.

10. The system of claim 8 wherein the air movement devices of the plurality of air movement devices are positioned at different locations along a central axis of the containment assembly.

11. The system of claim 10 wherein the air movement devices of the plurality of air movement devices are positioned in at least two tiers of air movement devices located at different locations along a central axis of the containment assembly, each of the tiers having at least two air movement devices.

12. The system of claim 3 additionally comprising an antenna support assembly extending upwardly from a main pole, the antenna support assembly comprising:

a mast for extending upwardly from the main pole, the mast having an upper end and a lower end; and a plurality of supports mounted on the mast, the plurality of supports including:

an uppermost support positioned toward the upper end of the mast; and a lowermost support positioned toward the lower end of the mast, the at least one air entry opening being formed by an aperture in the lowermost support;

wherein the active air movement structure includes a plurality of air movement devices, at least one of the air movement devices being mounted on the lowermost support of the antenna support assembly adjacent to the aperture to produce air movement into the interior of the containment assembly through the at least one air entry opening.

13. The system of claim 12 wherein the at least one air exit opening is formed by an aperture in the uppermost support of the antenna support assembly; and wherein at least one of the air movement devices is mounted on the uppermost support of the antenna support assembly adjacent to the aperture to produce air movement out of the interior of the containment assembly through the at least one air exit opening.

14. The system of claim 3 wherein the active air movement structure further includes a sensor assembly configured to sense characteristics associated with the containment assembly.

15. The system of claim 14 wherein the sensor assembly comprises at least one temperature sensor configured to sense a temperature of air in the interior of the containment assembly.

16. The system of claim 14 wherein the sensor assembly comprises at least one temperature sensor configured to sense a temperature of a surface of an element in the interior of the containment assembly.

17. The system of claim 14 wherein the sensor assembly comprises a plurality of temperature sensors located in the interior of the containment assembly at different locations along a central axis of the first end of the containment assembly.

18. The system of claim 14 wherein the active air movement structure further includes a control assembly including a controller configured to activate and deactivate operation of an air movement device of the air movement assembly, the controller being in communication with the sensor assembly to receive information regarding characteristics associated with the containment assembly and operation of the air movement assembly.

* * * * *